United States Patent

[19]

Green

[11] Patent Number: 6,152,401

[45] Date of Patent: Nov. 28, 2000

[54] DEPLOYABLE CHAIR SYSTEM FOR USE IN PATIENT TRANSPORT AIRCRAFT

[75] Inventor: Lowell A. Green, Littleton, Colo.

[73] Assignee: Air Methods Corporation, Englewood, Colo.

[21] Appl. No.: 08/997,360

[22] Filed: Dec. 23, 1997

[51] Int. Cl.[7] .......................... B54D 25/02; B54D 11/06
[52] U.S. Cl. ...................................................... 244/118.6
[58] Field of Search ............................. 244/118.6, 118.5, 244/118.2, 118.1

[56] References Cited

U.S. PATENT DOCUMENTS

| | | | |
|---|---|---|---|
| 2,337,505 | 12/1943 | Swift | 296/19 |
| 2,480,322 | 8/1949 | Cozzoli | 244/118.6 |
| 2,606,727 | 8/1952 | Dettaven | 244/118.6 |
| 2,640,996 | 6/1953 | Davis | 5/8 |
| 3,605,136 | 9/1971 | Vichness et al. | 5/8 |
| 3,840,265 | 10/1974 | Stirling et al. | 296/19 |
| 4,115,884 | 9/1978 | Keogh | 5/82 R |
| 4,178,032 | 12/1979 | Hone | 296/19 |
| 4,378,128 | 3/1983 | Holling et al. | 296/19 |
| 4,483,499 | 11/1984 | Fronk | 244/118.1 |
| 4,783,025 | 11/1988 | Moffett | 244/118.5 |
| 5,372,339 | 12/1994 | Morgan | 224/118.5 |
| 5,383,629 | 1/1995 | Morgan | 244/118.6 |
| 5,490,703 | 2/1996 | Hewko | 296/19 |
| 5,535,964 | 7/1996 | Ahlsten | 244/118.5 |
| 5,595,470 | 1/1997 | Berkey et al. | 414/495 |
| 5,813,629 | 9/1998 | Cabrera | 244/118.6 |
| 5,836,547 | 11/1998 | Koch et al. | 244/122 R |

FOREIGN PATENT DOCUMENTS 1491267  10/1969  Germany .

OTHER PUBLICATIONS

Heli–Dyne Systems, Inc., "Dual Pivoting Litter Carriage" Brochure.

*Primary Examiner*—Robert P. Swiatek
*Attorney, Agent, or Firm*—Marsh Fischmann & Breyfogle, LLP

[57] ABSTRACT

An emergency medical system for use in an aircraft. In one embodiment, the system includes a deployable chair and upper and lower support members for supporting the deployable chair, the deployable chair being pivotally interconnected to the upper support member. In the deployed configuration, the deployable chair is releasably interconnectable to the lower support member, which is one of a floor platform of the aircraft and a vertically adjustable litter platform. In the stowed configuration, the deployable chair is releasably interconnectable to an upper portion of the aircraft, such as a ceiling surface to allow patients to be received on at least one vertically adjustable litter platform located there below.

20 Claims, 10 Drawing Sheets

DEPLOYABLE CHAIR SYSTEM FOR USE IN PATIENT TRANSPORT AIRCRAFT

FIELD OF THE INVENTION

The present invention generally relates to emergency medical systems, and in particular, emergency medical systems for use in vehicles, such as aircraft.

BACKGROUND OF THE INVENTION

The air medical industry has long recognized the importance of providing effective medical attention to a patient during transport of the patient from the emergency site to a permanent medical facility. As such, an efficiently designed patient transport aircraft interior is a necessity in the air medical industry. Aircraft interior space that is not well-planned with respect to equipment location, patient location and attendant accessibility to both the equipment and the patient, can be a detriment to effectively treating the patient or patients, and can be uncomfortable for both attendants and patients.

The air medical industry has also recognized the importance of weight and strength when designing aircraft interiors. In this regard, the components comprising the aircraft interior must be lightweight without sacrificing strength and durability. Aircraft components that are unnecessarily heavy may detrimentally effect the balance and performance of a patient transport aircraft. And, aircraft components which are not structurally sound may adversely affect the patients or attendants in crash conditions.

In this regard, there is a need for a system of adapting medical equipment, stretchers, and other load members within the interior of an patient transport aircraft that efficiently utilizes available space within the aircraft interior. In addition, the system should be lightweight, strong, easily installable and easily maintainable.

SUMMARY OF THE INVENTION

Accordingly, it is an object of the present invention to provide emergency medical system for use in an vehicle, such as an aircraft.

It is another object of the present invention to provide an emergency medical system which efficiently utilizes the limited available space with an aircraft.

It is a further object of the present invention to provide an emergency medical system which is capable of transporting and/or treating prone position.

It is still another object of the present invention to provide a lightweight emergency medical system having crash attenuation features.

The present invention achieves one or more of these objects by providing an emergency medical system for use in the interior cargo area of a vehicle, such as an aircraft. Generally, the emergency medical system of the present invention includes a deployable chair interconnectable to upper and lower support members, which are interconnected to the vehicle itself. More specifically, the deployable chair includes a back member and a seat member pivotally interconnected thereto. An upper portion of the back member may be pivotally interconnected to the upper support member to allow rotational movement of the back member, and thus the deployable chair, about an axis of rotation defined by the upper support member. In this regard, the deployable chair may be rotated between a first position corresponding to the deployable chair being in a deployed configuration suitable for supporting a person, such as a medic or attendant, sitting thereon and to a second position corresponding to the deployable chair being in a stowed configuration, whereby space formerly occupied by the deployable chair can be utilized for transporting and/or treating patients.

As noted hereinabove, the deployable chair generally includes the back member and a seat member which is pivotally attached thereto. In this regard, the seat member is rotatable about an intermediate portion of the back member. As such, in the deployed configuration of the deployable chair, at least the front portion of the seat member may be rotated away from and relative to the back member to allow an attendant or patient to sit thereon. In the stowed configuration, at least the front portion of the seat member may be rotated toward and relative to the back member, such that the seat member is folded away to occupy less space.

In instances where the deployable chair is in the deployed configuration, the system includes a means for releasably securing at least a lower portion of the back member to the lower support member. In this deployed configuration, the back member of the deployable chair extends between and is interconnectable to the upper and lower support members. In one embodiment, the lower support member comprises a floor or floor platform of the interior cargo area of the aircraft. In another embodiment, where it is desirable to transport and treat at least one patient on at least a first litter platform within the aircraft's interior space formerly occupied by at least one deployed chair of the present invention, the lower support member comprises at least a first vertically adjustable litter platform, which is positionable at a plurality of vertical positions and orientations, between the floor and ceiling surfaces of the interior cargo space of the aircraft. In this regard, in instances where it is desirable to transport seated patients or attendants aboard the aircraft, at least the first litter platform may be moved downwardly to a first position which corresponds to a location below the seat member of the deployable chair and above the floor or floor platform of the aircraft. And, when it is desirable to transport and treat patients in a prone position, the deployable chairs of the present invention may be moved to the second position, to a stowed configuration, which allows at least the first litter platform to be moved upwardly and/or tilted to a plurality of tilt orientations to facilitate medical treatment. As such, the system may further include a means, interconnected with at least the first litter platform, for adjusting the vertical position and/or orientation of at least the first litter platform.

In instances where the deployable chair is in the stowed configuration, the system further includes a means for releasably securing the deployable chair in the second position, about a ceiling surface of the aircraft's interior cargo space. In one embodiment, the means for releasably securing comprises a means for inhibiting at least downward rotation movement of at least lower end portions of the back member about the upper support member. In this regard, the means for securing may be interconnected to the ceiling or upper frame of the aircraft to secure the deployable chair above patients and attendants in the interior of the aircraft. As such, the deployable chair may be releasably secured about the ceiling of the interior cargo space, substantially removed from the patient treatment areas, which allows attendants to freely move about the interior cargo space of the aircraft.

DETAILED DESCRIPTION OF THE INVENTION

Figure 1:
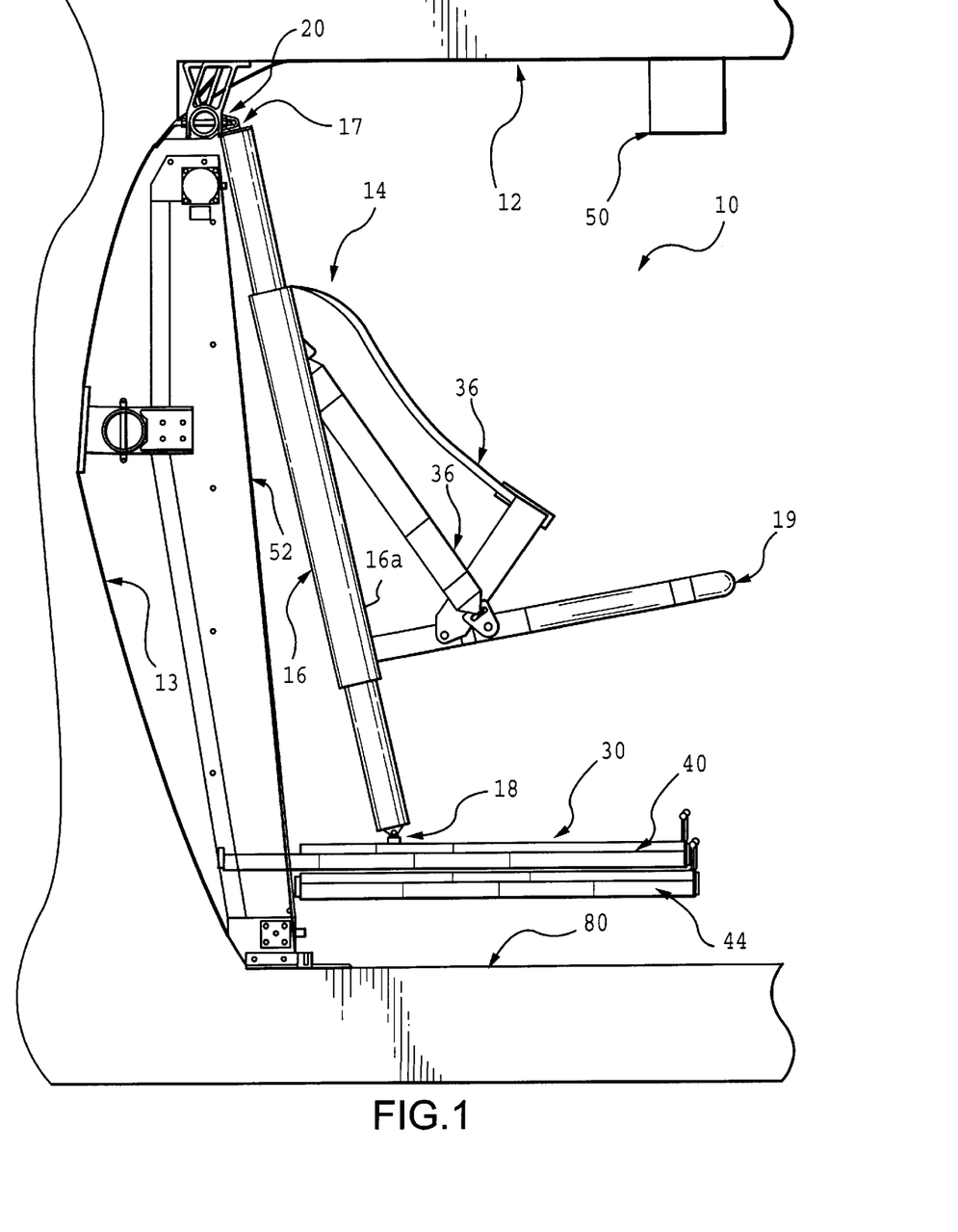
FIG. 1 illustrates a side view of the system of the present invention, whereby a deployable chair is in a deployed configuration, interconnected to upper and lower support members.
Figure 2:
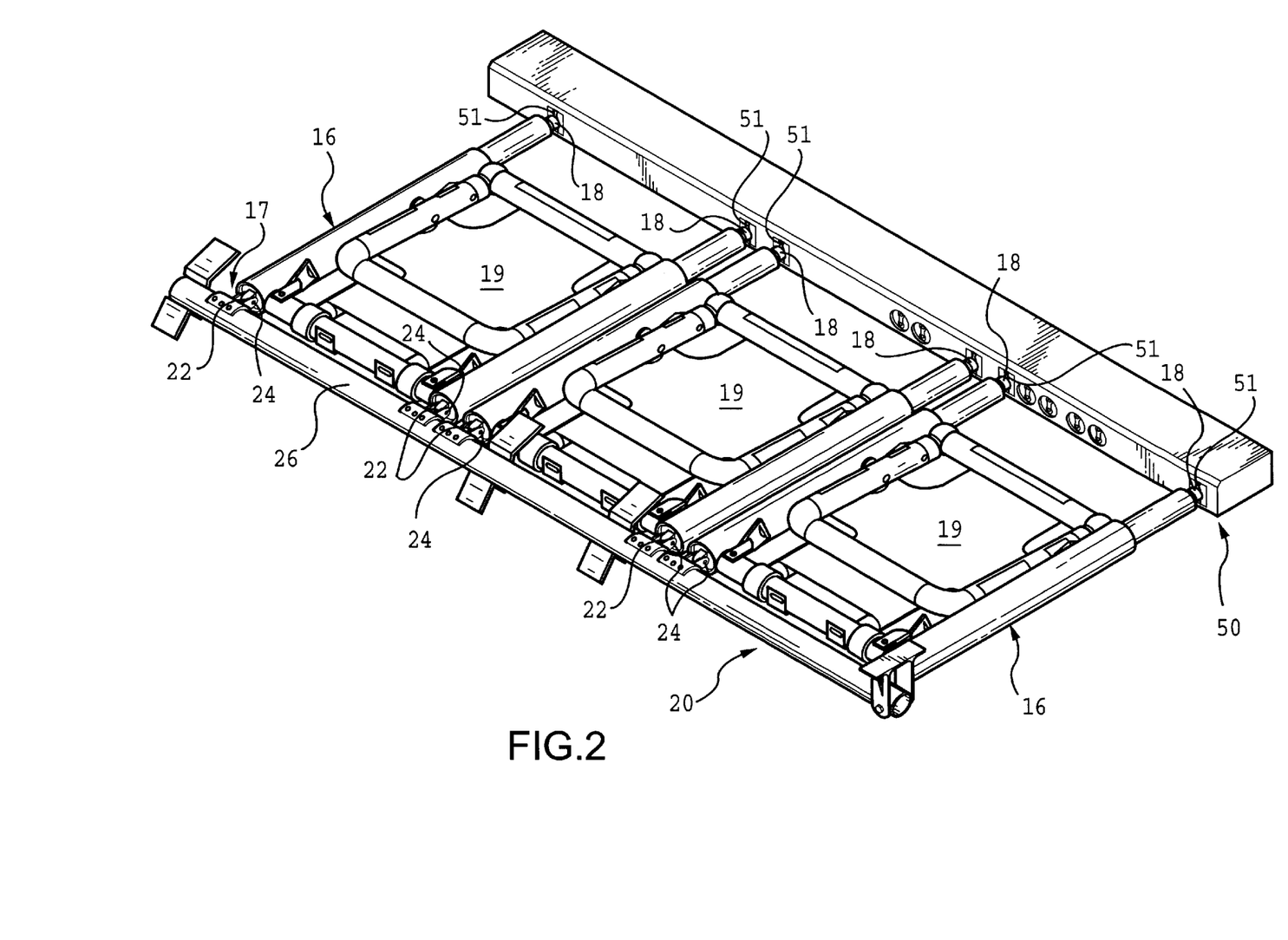
FIG. 2 illustrates a perspective view of a plurality of deployable chairs of the present invention in a stowed configuration, interconnected to an upper support member and a chair securing member interconnectable to a ceiling of the aircraft.

FIGS. 1–8 illustrate the various features of the emergency medical system of the present invention. Generally, in referring to FIG. 1, the system 10 includes a deployable chair 14 for use within an interior area of a vehicle, such as an aircraft or a land or sea-based vehicle. For purposes of efficiently utilizing the limited interior space of such vehicles while providing for the transport and/or treatment of patients and attendants, the deployable chair 14 is movable between first and second positions corresponding to deployed and stowed configurations, respectively. FIG. 1 illustrates the deployable chair 14 in the deployed configuration while FIG. 2 illustrates a plurality of deployable chairs 14 in a stowed configuration. In this regard, the system 10 further includes upper and lower support members 20, 30 respectively to support the deployable chair in either or both of the deployed and/or stowed configurations (as will be described in more detail hereinbelow).

As illustrated in FIGS. 1–3D, the deployable chair 14 of the system 10 of the present invention includes a back member 16 and a seat member 19 pivotally interconnected to and intermediate tube 16a of the back member 16. In one embodiment, for purposes of providing a deployable chair 14 which occupies a minimum area of space, especially when stowed, the seat member 19 is rotatable relative to the back member 16 such that the seat member 19 may be folded or rotated relative to the intermediate portion of the back member 16. The seat member 19 provides a support surface for supporting a person (not shown) sitting thereon. As such, each back member 16 is the primary load-bearing member of the deployable chair 14 which must withstand crash-loading, especially when used in aircraft.

Figure 8:
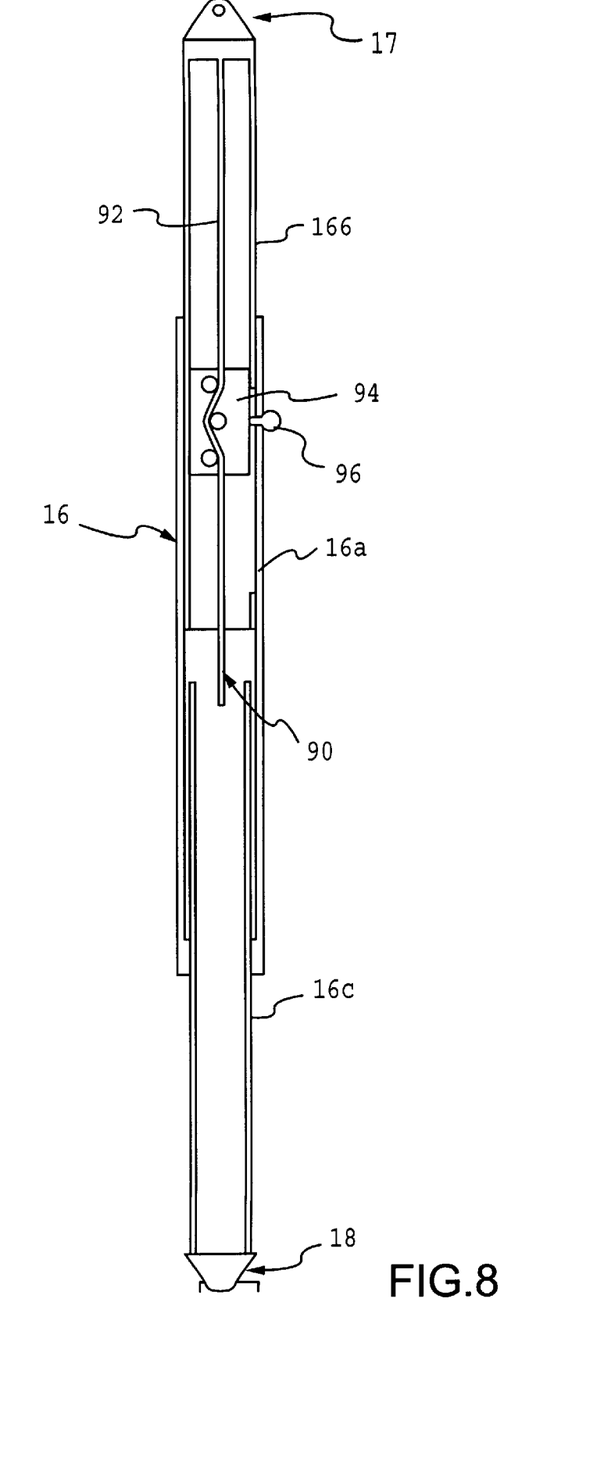
FIG. 8 illustrates a cut-away view of one of the telescopable back members of the present invention.

In one embodiment, illustrated in FIG. 8, the back member 16, which supports the seat member 19, includes compressive load attenuating means 90 for dissipating flight dynamic and crash loads. In this regard, the seat member 19 and a passenger thereon (not shown) are supported by the attenuating means 90. In particular, for purposes of dissipating flight dynamic and crash loads, such that spinal loads in the passenger sitting on the seat member 19 are reduced to survivable levels, the intermediate tube 16a of the back member 16 is designed to move along the telescoping support tubes 16b, 16c of the back member 16 to absorb such loads via the attenuating means 90. Such compressive load attenuating means 90 is contained with the back member 16. In this embodiment, the attenuating means 90 restrains the telescoping motion of the intermediate portion 16a of the back member 16, and as such, dissipates loads, by deforming metal. Specifically, the attenuating means 90 includes an attenuator wire 92 which is snaked or drawn through a die block 94, which functions to bend or deform the wire 92 when the seat member 19 is subjected to loading. The die block 94 is anchored to the intermediate portion 16a of the back member 16 via the die block pin 96, such that loads are translatable to the die block 94 and into the attenuating wire 92 to reduce loading on a person sitting on the seat member 19. Such an arrangement of the die block and attenuating wire is commercially available from various sources.

For purposes of adequately supporting at least one deployable chair 14 and persons sitting thereon, the upper support member 20 is interconnected to the frame of the vehicle and to an upper portion of at least a first deployable chair 14. More specifically, and as illustrated in FIGS. 1–2 and 3A–3D, an upper portion 17 of the back member 16 of the deployable chair 14 is pivotally interconnected to the upper support member 20 such that at least the back member 16, and therefore the deployable chair 14, is rotatable about the upper support member 20 between the deployed and stowed configurations. In one embodiment, upper portions 17 of the back member 16 are pivotally interconnected to plate pairs 22 via pins 24, the plate pairs 22 being fixedly interconnected to a tube 26 which defines the upper support member 20 (e.g., swivel joint).

Figure 3A:
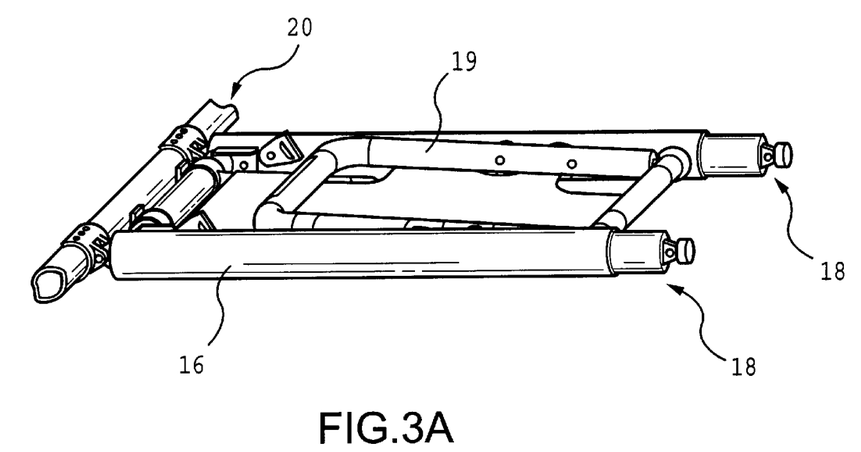
FIGS. 3A–3D illustrate progressive views of a deployable chair of the present invention being deployed from a stowed orientation to a deployed orientation interconnected to a first litter platform.
Figure 3B:
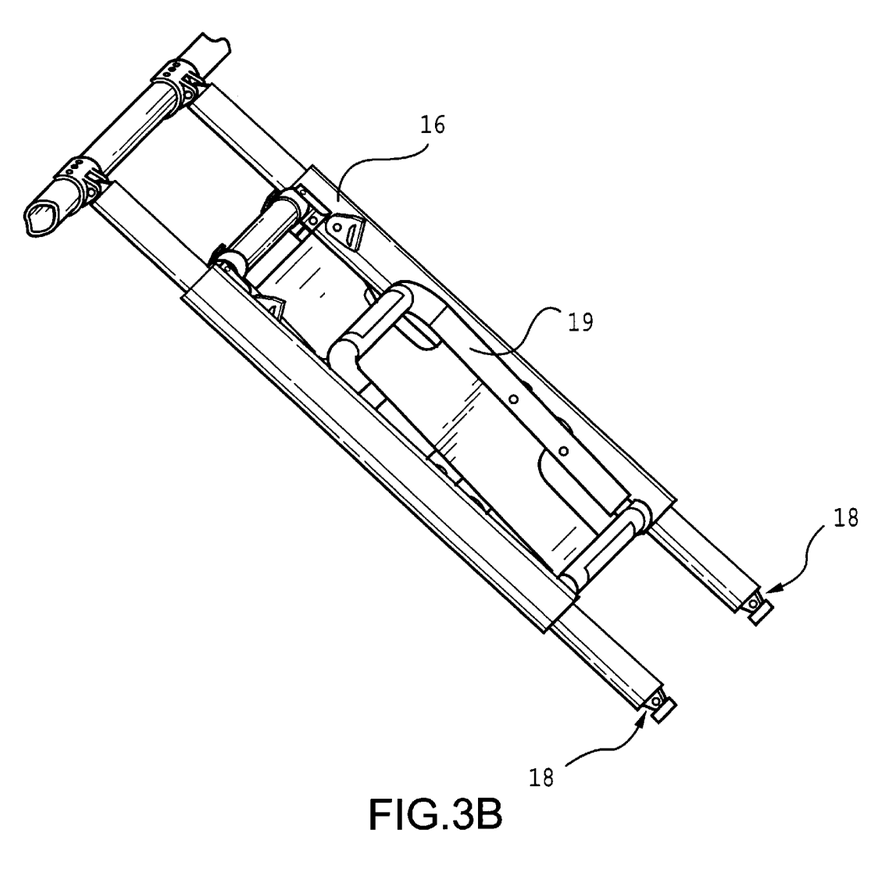
Figure 3C:
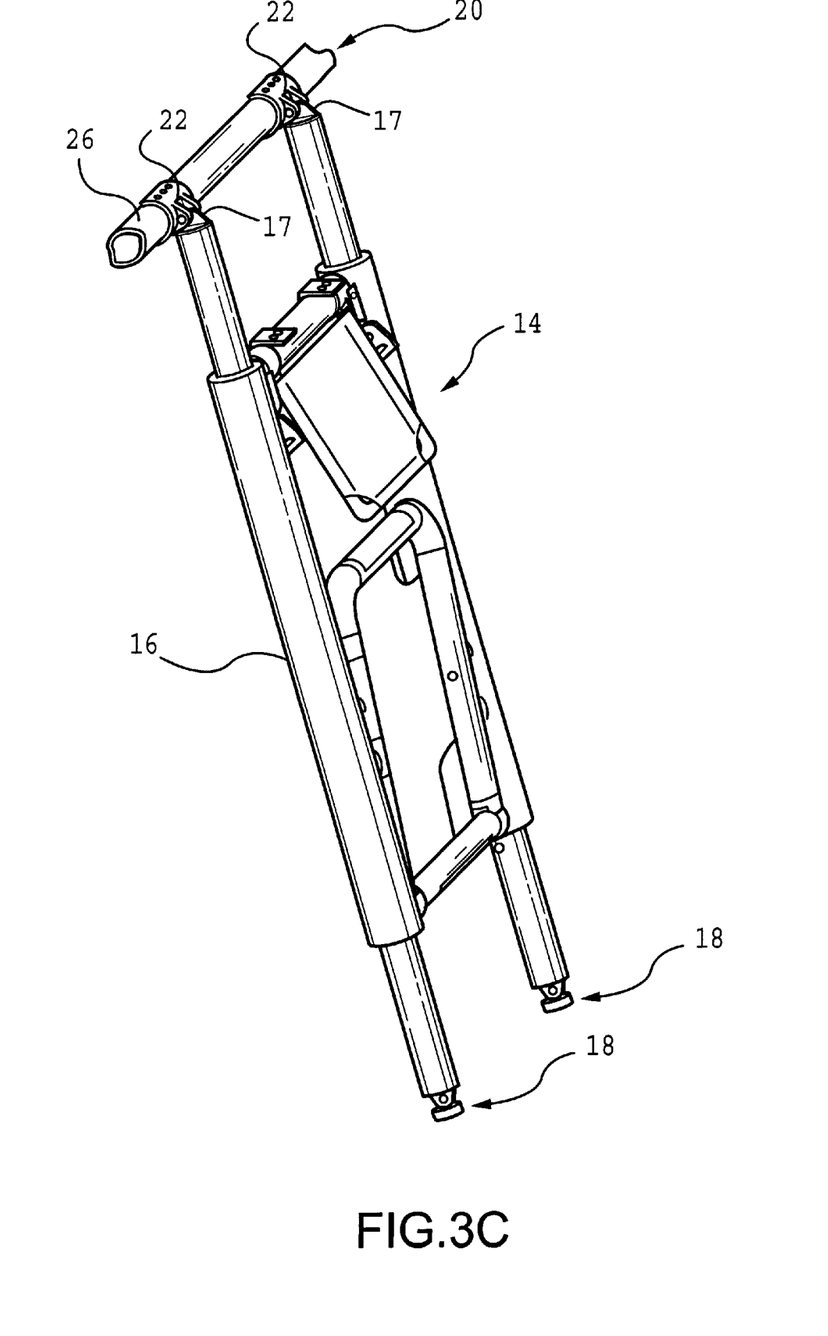
Figure 3D:
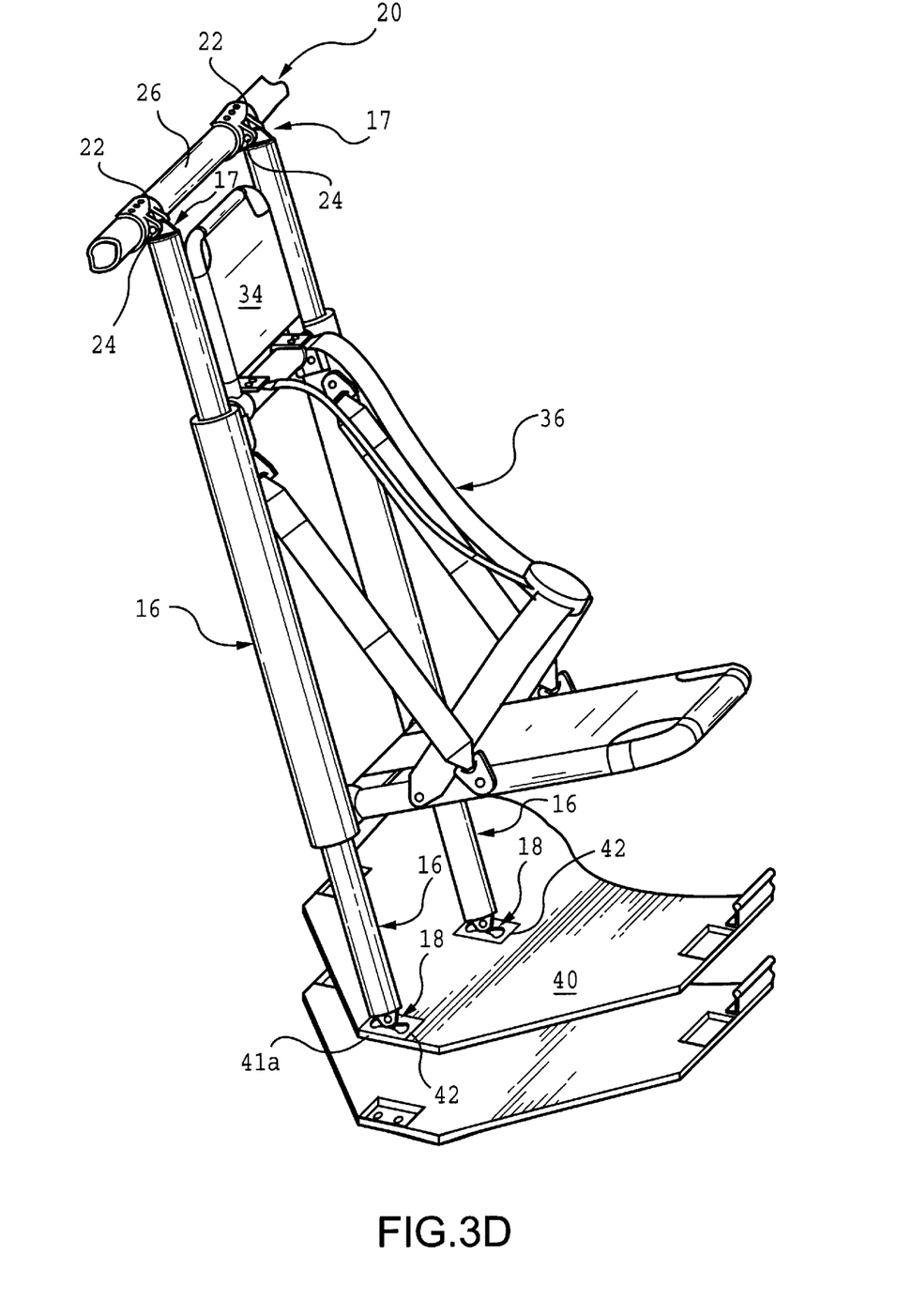
Figure 4:
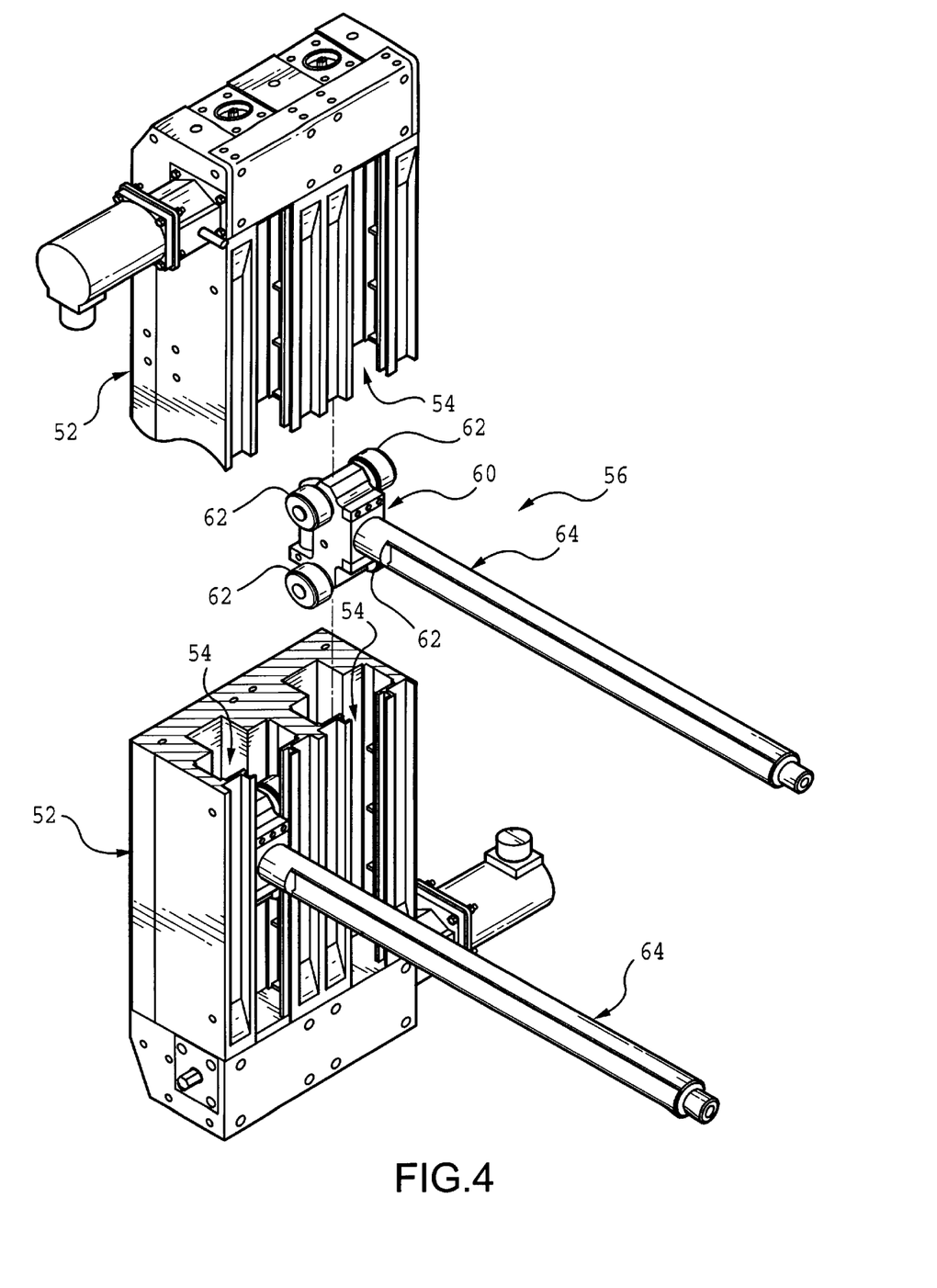
FIG. 4 illustrates a perspective view of a system for vertically adjusting an end portion of at least the first litter platform.
Figure 5:
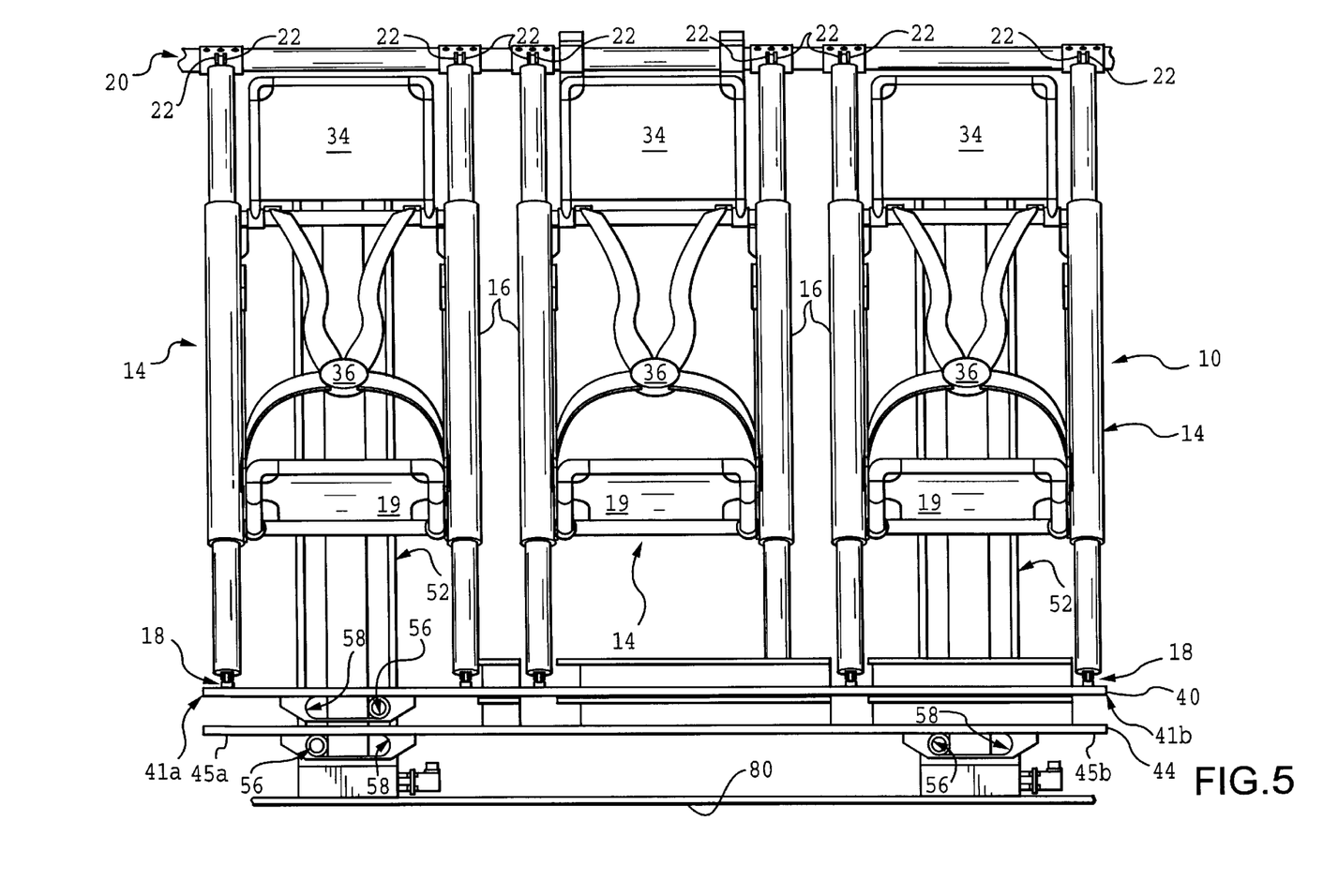
FIG. 5 illustrates a front view of a plurality of deployable chairs of the present invention in a deployed configuration, interconnected to an upper support member and a first litter platform vertically adjusted to a first, lowered position.

While in a deployed configuration, illustrated in FIGS. 1, 3D and 5, the deployable chair 14 is also supported by a lower support member 30 at lower end portions 18 of the back member 16. In one embodiment, illustrated in FIGS. 1, 3D and 5, the lower support member 30 includes a vertically adjustable first litter platform 40 capable of supporting a patient thereon, above the floor 80 of the aircraft. In another embodiment, illustrated in FIG. 7, lower end portions 118 of the back member 116 of the deployable chair 114 are releasably securable to a floor platform 180 of the vehicle. In both embodiments, lower end portions of the back member include a means for releasably securing the back member to the lower support member to allow the deployable chairs to be quickly and efficiently moved in and out of deployed configurations. In one embodiment, standard ANCRA-style fittings are provided on the lower end portions 18 of the back member 16 to releasably secure the deployable chair 14 to the lower support member 30. In the illustrated embodiments, the first litter platform 40 includes appropriately positioned tracks 42 (e.g., seat track) capable of receiving and releasably locking the ANCRA-style fittings interconnected to the lower end portions 18 of the back member 16, as illustrated in FIG. 3D.

For purposes of allowing the transport and treatment of patients in a prone position, the system 10 of the present invention also includes a means 50 for releasably securing one or more deployable chair 14 about the ceiling 12 of the vehicle. In this regard, the means 50 for securing one or more of the deployable chairs 14 includes a means for inhibiting downward rotation (e.g., relative to the ceiling 12)

of the deployable chair 14 about the upper support member 20. In one embodiment, illustrated in FIGS. 1 and 2, the means 50 for securing is interconnected to the ceiling 12 and includes a plurality of clamps 51 for receiving and releasably securing lower end portions 18 (e.g., having ANCRA-style fittings) of the back member 16 or other suitable releasable locking mechanisms. In order to minimize increases in weight, the means 50 for securing may be incorporated into an overhead control panel, which is standard in a variety of aircraft use for medical transport.

In order to provide a deployable chair 14 capable of being stowed within the limited confines of a vehicle's interior cargo space, the back member 16 of the deployable chair 14 includes at least two telescoping tubes slidably engagable with each other to provide retractive and extensive movement. Such telescoping capability is especially useful for stowing a plurality of deployable chairs 14 about both sides of a centrally positioned overhead control panel 50, the deployable chairs 14 being positioned along opposing sidewalls 13 of a narrow vehicle (e.g., helicopter). In this regard, and as illustrated in FIGS. 3A–3D, the back member 16 of the deployable chair 14 is extendable when the deployable chair 14 is moved to a first position corresponding to a deployed configuration of the deployed chair, and is retractable when the deployable chair 14 is moved to a second position corresponding to a stowed configuration of the deployed chair 14. In this regard, the deployable chairs 14 of the present invention are installable within vehicles (e.g., airplanes, helicopters) of varying heights and widths.

For purposes of providing added comfort and safety to persons sitting on deployable chair 14, the chair 14 may further include a headrest 34 and restraints 36. In order to provide a light-weight, crash worthy structure, the back member 16 and the seat member 19 may have a tubular construction with a flexible material extending between the tubular frame of the back member 16 and between the tubular frame of the seat member 19 for supporting a patient or person thereon. In one embodiment, the flexible material is fabricated from cloth, plastic or leather, or while the tubing of the back member 16 and seat member 19 is fabricated from a lightweight metal, such as high strength aluminum.

Figure 6:
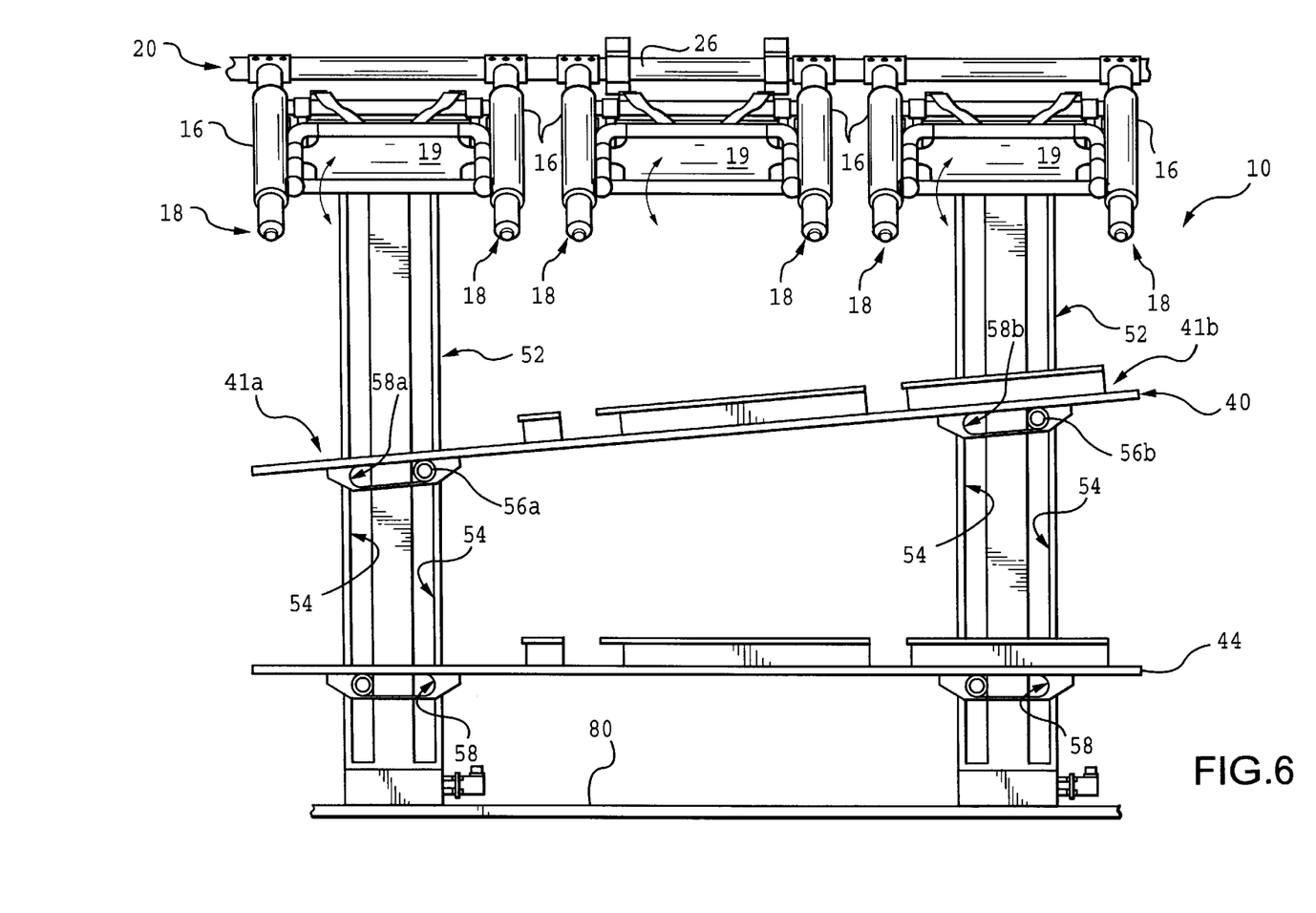
FIG. 6 illustrates a front view of a plurality of deployable chairs of the present invention being moved toward a second position corresponding to the stowed configuration to allow at least the first litter platform to be vertically adjusted to accommodate treatment of a patient.
Figure 7:
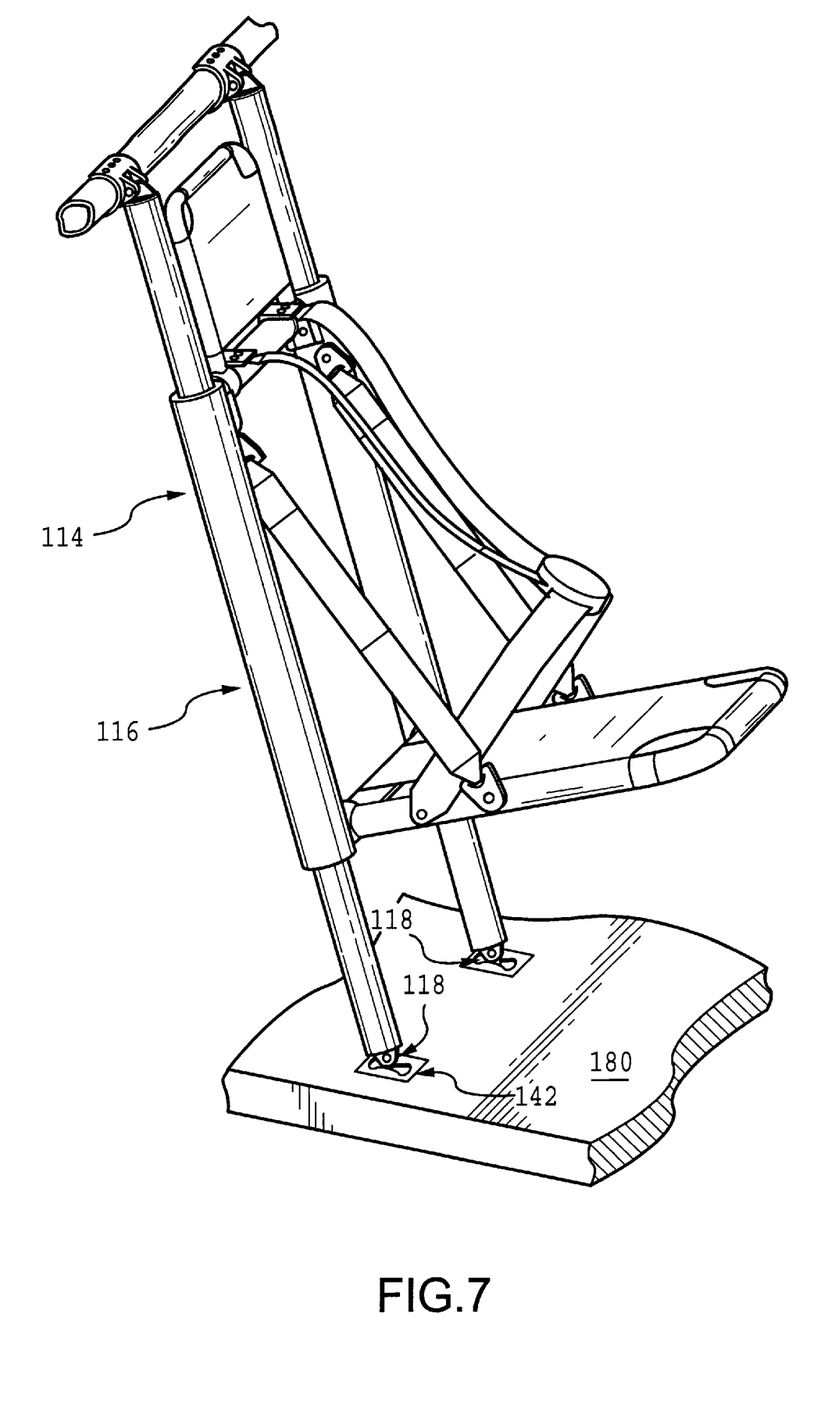
FIG. 7 illustrates an another embodiment of the system of the present invention, whereby the deployable chair is in a deployed configuration, interconnected to an upper support member and a floor platform of the aircraft.

As illustrated in FIGS. 1, 3D and 4–6, the system 10 further includes a means for vertically adjusting the vertical position of at least the first litter platform 40, and specifically end portions 41a, 41b of the first litter platform 40. Such means for vertically adjusting the vertical position of at least the first litter platform 40 is of the type generally disclosed in commonly assigned U.S. Pat. No. 5,372,339, which is specifically incorporated herein by reference. The means for vertically adjusting the vertical position of at least the first litter platform 40 of the present invention may be used to vertically move at least the first litter platform 40 downwardly (e.g., from an elevated position), to a first, lowered position, whereby the deployable chairs 14 may be deployed and interconnected to the first litter platform 40, as illustrated in FIG. 5. Additionally, in instances where patients are to be transported and/or treated in a prone position, the means for vertically adjusting the vertical position of at least the first litter platform 40 may be used to vertically move at least one or both end portions 41a, 41b of the first litter platform 40 upwardly relative to the floor platform 80 of the vehicle, whereby the deployable chairs 14 are movable to a stowable configuration, as illustrated in FIG. 6. In this regard, the means for vertically adjusting the vertical position of at least the first litter platform 40 is capable of controlling the elevation of at least one litter platform to facilitate the transport and treatment of prone positioned patients when the deployable chairs 14 are in a stowed configuration. In one embodiment, illustrated in FIGS. 4–6, the means for vertically adjusting includes a pair of substantially parallel horizontally spaced vertical control masts 52 which are mounted to an interior wall or frame of the aircraft. Each of the control masts 52 includes a pair of substantially parallel slots or tracks 54 within which are slidably engaged a pair of support assemblies 56 which are independently movable within each mast 52.

The system 10 further includes a vertical adjustment means (not shown) for independently adjusting the vertical position of each support assembly 56 to control the vertical spacing between the first litter platform 40 and a second litter platform 44 or the floor platform 80. Each litter support assembly 56 is operatively connected to the vertical adjustment means (e.g., drive screw) for vertical translational movement. The litter support assemblies 56 are further adapted to slidably and pivotally engage the end portions 41a, 41b, 45a, 45b of the first and second litter platforms 40, 44 within slots 58 supporting the first and second litter platforms 40, 44, which allows tilting of the litter platforms 40, 44. For example, and as illustrated in FIG. 6, a first support assembly 56a may engage the first end portion 41a of the first litter platform 40 within the slot 58a associated therewith while a second, independently controlled support assembly 56b may engage the second end portion 41b of the first litter platform 40 within the slot 58b. In instances where a tilt orientation of the first litter platform 40 is desired to enhance medical treatment (e.g., shock and anti-shock treatment), one end portion (e.g., end portion 41b) of the first litter platform 40 may be vertically translated to a height different than the height of the other end portion (e.g., end portion 41a) of the first litter platform 40.

Each support assembly 56 includes a support member 64 receivable within the slots 58 of the litter platforms 40, 44 and carriage assembly 60 having a plurality of wheels 62, the carriage assembly 60 being receivable within the tracks 54 of the masts 52. In use, and referring to FIG. 5, when it is desirable to have the deployable chairs 14 in the deployed configuration, the first and second litter platforms 40, 44 are lowered by lowering each of the support assemblies 56, such that at least the second litter platform 44 is proximate the floor platform 80, and the first litter platform 40 is proximate the second litter platform 44, as illustrated in FIG. 5. Such positioning of the first and second litter platforms 40, 44 allows the deployable chairs 14 to be deployed to support attendants and/or patients seated thereon. The system 10 of the present invention also allows the deployable chairs 14 to be rotated upwardly, towards the ceiling to be stowed to allow at least the first litter platform 40 to be moved vertically upward and, if desired, tilted to accommodate shock and anti-shock positioning of a patient positioned on the first litter platform 40. In addition, the second litter platform 44 may be moved vertically upward to facilitate treatment of a patient positioned thereon by an attendant.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An emergency medical system for use in an aircraft, said system comprising:
   upper and lower support members interconnectable to the aircraft; and
   a chair having a back member and a seat member interconnectable to said back member, wherein said back member is pivotally interconnectable to said upper support member defining a first axis of rotation to allow rotational movement of said back member about said upper support member, wherein said back member is rotatable between a first position corresponding to said chair being in a deployed configuration for supporting a person sitting thereon and a second position corresponding to said chair being in a stowed configuration, wherein said seat member is pivotally interconnectable to said back member about a second axis of rotation to allow rotational movement of said seat member relative to said back member, wherein said first and second axes of rotation are parallel.

2. An emergency medical system, as claimed in claim 1, wherein said back member comprises upper and lower portions, wherein said upper portion of said back member is pivotally interconnectable to said upper support member and said lower portion of said back member is releasably securable to said lower support member when said back member is in said first position.

3. An emergency medical system, as claimed in claim 1, further comprising:
   a means, interconnected with the aircraft, for securing said back member in said second position corresponding to said chair being in the stowed configuration.

4. An emergency medical system, as claimed in claim 3, wherein said means for securing is interconnected to said upper support member and comprises a means for inhibiting rotational movement of said back member about said upper support member.

5. An emergency medical system, as claimed in claim 3, wherein said means for securing is laterally displaced from said upper support member and comprises a means, interconnected to the aircraft, for releasably engaging at least a portion of said back member to hold said back member in said second position.

6. An emergency medical system, as claimed in claim 1, wherein said back member comprises at least one telescoping member capable of extensive and retractive movement as said back member is rotated between first and second positions corresponding to the deployed and stowed configurations of said chair, respectively.

7. An emergency medical system, as claimed in claim 1, wherein said back member comprises a means for attenuating compressive loads.

8. An emergency medical system, as claimed in claim 1, wherein said back member comprises first and second ends and an intermediate portion therebetween, wherein said seat member is pivotally interconnectable to said intermediate portion of said back member.

9. An emergency medical system, as claimed in claim 1, wherein said upper support member comprises a swivel joint interconnectable to a frame member of the aircraft.

10. An emergency medical system for use in an interior of an emergency vehicle, said system comprising:
    upper and lower support means interconnectable to the vehicle; and
    a chair having a back member interconnectable to a seat member, wherein said back member is pivotally interconnectable to said upper support means defining a first axis of rotation to allow said back member to rotate about said upper support means, between first and second positions corresponding to said chair being in a deployed configuration for supporting the person sitting thereon and a stowed configuration, respectively, said back member being releasably securable to said lower support means comprising one of a floor platform positionable within the interior area of the vehicle and a first litter platform positional above said floor platform at least when said chair is in the deployed configuration, wherein said seat member is pivotally interconnectable to said back member about a second axis of rotation, wherein said first and second axes of rotation are parallel.

11. An emergency medical system as claimed in claim 10, wherein said lower support means comprises said first litter platform, wherein said first litter platform is capable of supporting at least the person lying thereon when said chair is in the stowed configuration.

12. An emergency medical system as claimed in claim 11, further comprising:
    a means, interconnected to said vehicle, for securing said back member in said second position corresponding to said chair being in the stowed configuration.

13. An emergency medical system, as claimed in claim 10, further comprising:
    a means, interconnected to said vehicle and at least said first litter platform, for moving at least said first litter platform to a plurality of vertical positions relative to said floor platform, wherein said first litter platform is positionable at a first litter platform position to support at least said back member when said back member is in said first position corresponding to said chair being in the deployed configuration.

14. An emergency medical system, as claimed in claim 10, wherein said means for moving at least said first litter platform comprises:
    a pair of substantially parallel horizontally spaced control masts mounted to the vehicle in the interior area of the vehicle, wherein each of said control masts includes at least one lift track; and
    a first pair of support assemblies engagable with end portions of said first litter platform and slidably engagable with a respective one of said lift tracks of said control masts to permit raising of at least said first litter platform relative to said floor platform.

15. An emergency medical system, as claimed in claim 14, wherein said means for moving further comprises:
    a vertical adjustment means for independently adjusting the vertical position of each of said support assemblies to control the spacing between at least said first litter platform and said floor platform.

16. An emergency medical system, as claimed in claim 15, further comprising:
    a second litter platform positionable between said first litter platform and said floor platform and interconnectable to one of said floor platform and a second pair of support assemblies to allow vertical positioning thereof relative to said floor platform, said second pair of support assemblies being engagable with end portions of said second litter platform and slidably engagable with another of said lift tracks of said control masts to permit raising of said second litter platform relative to said floor platform.

17. An emergency medical system, as claimed in claim 10, further comprising:
a means, interconnected with the vehicle, for securing said back member in said second position corresponding to said chair being in the stowed configuration.

18. An emergency medical system, as claimed in claim 17, wherein said means for securing is interconnected with the vehicle and comprises one of a means for inhibiting rotational movement of said back member about said upper support means and a means for releasably engaging at least a portion of said back member to hold said back member in said second position.

19. An emergency medical system, as claimed in claim 10, wherein said back member comprises at least one telescoping member capable of extensive and retractive movement as said back member is moved between said first and second positions corresponding to the deployed and stowed configurations of said chair, respectively.

20. An emergency medical system, as claimed in claim 10, wherein said back member comprises at least first and second wire bender telescoping members capable of attenuating compressive forces, wherein at least said seat member extends between and is pivotally interconnectable to said first and second wire bender telescoping members to allow said seat member to rotate at least between first and second seat member positions corresponding to said chair being in the deployed configuration and the stowed configuration, respectively.

* * * * *